(12) United States Patent
Yoshida et al.

(10) Patent No.: US 10,394,226 B2
(45) Date of Patent: Aug. 27, 2019

(54) CONTROL PARAMETER OPTIMIZING SYSTEM THAT OPTIMIZES VALUES OF CONTROL PARAMETERS OF AN EXISTING POWER PLANT AND OPERATION CONTROL OPTIMIZING APPARATUS EQUIPPED THEREWITH

(71) Applicant: Mitsubishi Hitachi Power Systems, Ltd., Nishi-ku, Yokohama (JP)

(72) Inventors: Yasuhiro Yoshida, Tokyo (JP); Takuya Yoshida, Tokyo (JP); Takaaki Sekiai, Tokyo (JP); Yuya Tokuda, Tokyo (JP); Kazunori Yamanaka, Yokohama (JP); Atsushi Yamashita, Yokohama (JP); Norihiro Iyanaga, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 440 days.

(21) Appl. No.: 15/195,271

(22) Filed: Jun. 28, 2016

(65) Prior Publication Data

US 2017/0003676 A1 Jan. 5, 2017

(30) Foreign Application Priority Data

Jun. 30, 2015 (JP) .................................. 2015-131764

(51) Int. Cl.
*G05B 19/418* (2006.01)
*G05B 15/02* (2006.01)
(Continued)

(52) U.S. Cl.
CPC ........ *G05B 19/41835* (2013.01); *G05B 11/01* (2013.01); *G05B 13/042* (2013.01);
(Continued)

(58) Field of Classification Search
CPC ...... G05B 11/01; G05B 13/042; G05B 15/02; G05B 19/4183; G05B 19/41835; G05B 2219/32015; G05B 2219/37591
(Continued)

(56) References Cited

U.S. PATENT DOCUMENTS 7,461,038 B2 * 12/2008 Kropaczek ........... G05B 13/024
703/13
2007/0168057 A1 7/2007 Blevins et al.
(Continued)

FOREIGN PATENT DOCUMENTS

JP 2001-209405 A 8/2001
JP 2004-178156 A 6/2004
(Continued)

OTHER PUBLICATIONS

Extended European Search Report issued in counterpart European Application No. 16176781.9 dated Nov. 7, 2016 (10 pages).
Japanese-language Office Action issued in counterpart Japanese Application No. 2015-131764 dated Oct. 30, 2018 (four (4) pages).

*Primary Examiner* — Chun Cao
(74) *Attorney, Agent, or Firm* — Crowell & Moring LLP

(57) ABSTRACT

A control parameter optimizing system and an operation optimizing apparatus equipped therewith are provided, the system being applicable to an existing plant without modifying the control panel or equipment of the plant, the system further being capable of optimizing the operation control of the plant in accordance with diverse operational requirements. The system includes an objective function setting section, a plant model, and a control parameter optimizing section. The control parameter optimizing section includes an optimization control parameter selecting section and an optimization control parameter adjusting section. The optimization control parameter selecting section selects as an optimization control parameter the control parameter for
(Continued)

optimizing an objective function based on control logic information extracted from a power plant. The optimization control parameter adjusting section adjusts the value of the optimization control parameter using the plant model in such a manner as to optimize the objective function.

10 Claims, 7 Drawing Sheets

(51) Int. Cl.
    *G05B 13/04*    (2006.01)
    *G05B 11/01*    (2006.01)

(52) U.S. Cl.
    CPC ......... *G05B 15/02* (2013.01); *G05B 19/4183* (2013.01); *G05B 2219/32015* (2013.01); *G05B 2219/37591* (2013.01)

(58) Field of Classification Search
    USPC ...................................................... 700/32, 34
    See application file for complete search history.

(56) References Cited

U.S. PATENT DOCUMENTS

| | | |
|---|---|---|
| 2007/0179919 A1 | 8/2007 | Kropaczek et al. |
| 2010/0089067 A1* | 4/2010 | Wilkes ............... G05B 23/0254 60/773 |
| 2010/0152900 A1 | 6/2010 | Gurciullo et al. |
| 2011/0098862 A1 | 4/2011 | Andrei et al. |
| 2012/0048492 A1 | 3/2012 | Bhat et al. |
| 2012/0207622 A1* | 8/2012 | Ebisawa ............... F04D 27/001 417/53 |
| 2013/0006429 A1 | 1/2013 | Shanmugam et al. |

FOREIGN PATENT DOCUMENTS

| | | |
|---|---|---|
| JP | 2006-33929 A | 2/2006 |
| JP | 2006-178626 A | 7/2006 |
| JP | 2007-206060 A | 8/2007 |
| JP | 2007-255198 A | 10/2007 |
| JP | 2012-27676 A | 2/2012 |
| JP | 2012-505289 A | 3/2012 |
| JP | 2013-508881 A | 3/2013 |

* cited by examiner

CONTROL PARAMETER OPTIMIZING SYSTEM THAT OPTIMIZES VALUES OF CONTROL PARAMETERS OF AN EXISTING POWER PLANT AND OPERATION CONTROL OPTIMIZING APPARATUS EQUIPPED THEREWITH

BACKGROUND OF THE INVENTION

1. Field of the Invention

The present invention relates to an apparatus for optimizing the operation control of a power plant or an industrial plant.

2. Description of the Related Art

There have been developed control technologies for improving the plant operability, particularly of a thermal power plant. The technologies include those for enhancing load following capability or shortening start-up time, etc., to stabilize an electric power system in response to fluctuations in the supply of renewable energy or in the demand for power.

JP-2007-255198-A discloses an optimum operation system which, used in an energy plant combining boilers, turbines and generators, determines the amount of steam generated by each boiler and the amount of steam and that of oil steam distributed to each turbine (the amounts are called control parameters) in such a manner as to minimize the total energy cost (improvement item) of the plant based on a characteristic model of each of the devices constituting the plant.

SUMMARY OF THE INVENTION

The optimum operation system described in the above-cited patent application presupposes that the specifications of the control panel at the power plant are already known and so are the operational requirements for the plant. For this system, the control parameters and improvement items are limited. However, the specifications of the control panel for the power plant differ from plant manufacturer to plant manufacturer and from equipment to equipment. The operational requirements for the power plant also vary depending on the country and the locality. Thus one problem with this optimum operation system is that it cannot support the various control panel specifications and diverse operational requirements in a one-size-fits-all manner; power plants having different control panel specifications or different operational requirements typically require their control panels or their equipment to be modified.

The present invention has been made in view of the above circumstances. An object of the present invention is to provide a control parameter optimizing system and an operation optimizing apparatus equipped therewith, the system being applicable to an existing plant without modifying the control panel or equipment of the plant, the system further being capable of optimizing the operation control of the plant in accordance with diverse operational requirements.

In solving the above problems and according to one embodiment of the present invention, there is provided a control parameter optimizing system including: an objective function setting section that sets an objective function to be optimized in controlling the operation of a plant; a plant model that simulates the operation of the plant and calculates a process amount of the plant and the objective function; and a control parameter optimizing section that optimizes the values of control parameters of the plant using the plant model in such a manner as to optimize the objective function. The control parameter optimizing section includes: an optimization control parameter selecting section which, based on control logic information extracted from the plant, selects as an optimization control parameter the control parameter for use in optimizing the objective function; and an optimization control parameter adjusting section that adjusts the value of the optimization control parameter using the plant model in such a manner as to optimize the objective function.

According to the present invention, it is possible to optimize the operation control of an existing plant regardless of the plant type or control panel specifications and without recourse to modifying the control panel or equipment of the plant.

DESCRIPTION OF THE PREFERRED EMBODIMENTS

Figure 1:
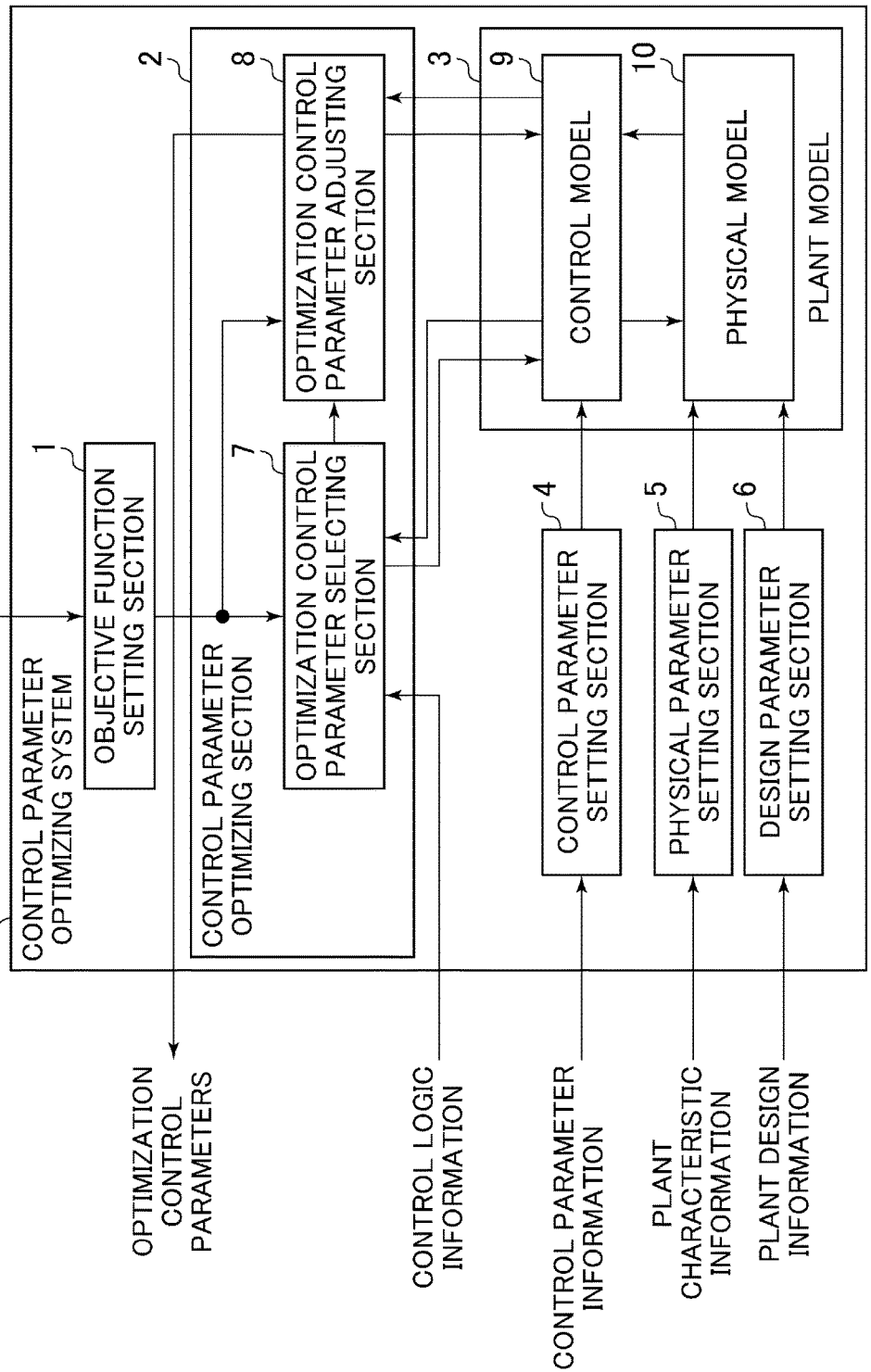
FIG. 1 is a block diagram showing a configuration of a control parameter optimizing system according to a first embodiment of the present invention.

Some preferred embodiments of the present invention are described below with reference to the accompanying drawings. Throughout the drawings, like reference numerals designate like or corresponding parts, and their descriptions will be omitted hereunder where redundant.

First Embodiment

FIG. 1 is a block diagram showing a configuration of a control parameter optimizing system according to a first embodiment of the present invention. In FIG. 1, the control parameter optimizing system 100 includes an objective function setting section 1, a control parameter optimizing section 2, a plant model 3, a control parameter setting section 4, a physical parameter setting section 5, and a design parameter setting section 6.

The objective function setting section 1 sets the objective functions inputted by an operator to the control parameter optimizing section 2. The objective functions in this context are the improvement items for plant operation control (such as start-up time, rate of load change, equipment lifetime consumption, fuel cost, and generation efficiency, etc.); they are each defined by the function of a plant process amount. There may be one or a plurality of objective functions to be inputted to the objective function setting section 1. One way of inputting an objective function to the objective function setting section 1 is by having a list of objective functions stored beforehand in a storage device of the control parameter optimizing system 100 and by allowing the operator to select from the objective function list the objective function to be optimized.

The control parameter optimizing section 2 includes an optimization control parameter selecting section 7 and an optimization control parameter adjusting section 8. The optimization control parameter selecting section 7 selects, from the control parameters of the plant of interest, the control parameter used to optimize the objective function (called the optimization control parameter hereunder where appropriate). The optimization control parameter adjusting section 8 adjusts the value of the optimization control parameter selected by the optimization control parameter selecting section 7.

Based on control logic information manually inputted by the operator or automatically inputted from an external system, the optimization control parameter selecting section 7 first extracts the control parameters related to the objective function (called the related control parameters hereunder where appropriate). The optimization control parameter selecting section 7 then selects from the related control parameters the one having high sensitivity to the objective function as the optimization control parameter. The optimization control parameter selecting section 7 then outputs the selected optimization control parameter to the optimization control parameter adjusting section 8. The sensitivity of each of the related control parameters to the objective functions is obtained through sensitivity analysis using the plant model 3.

Figure 2:
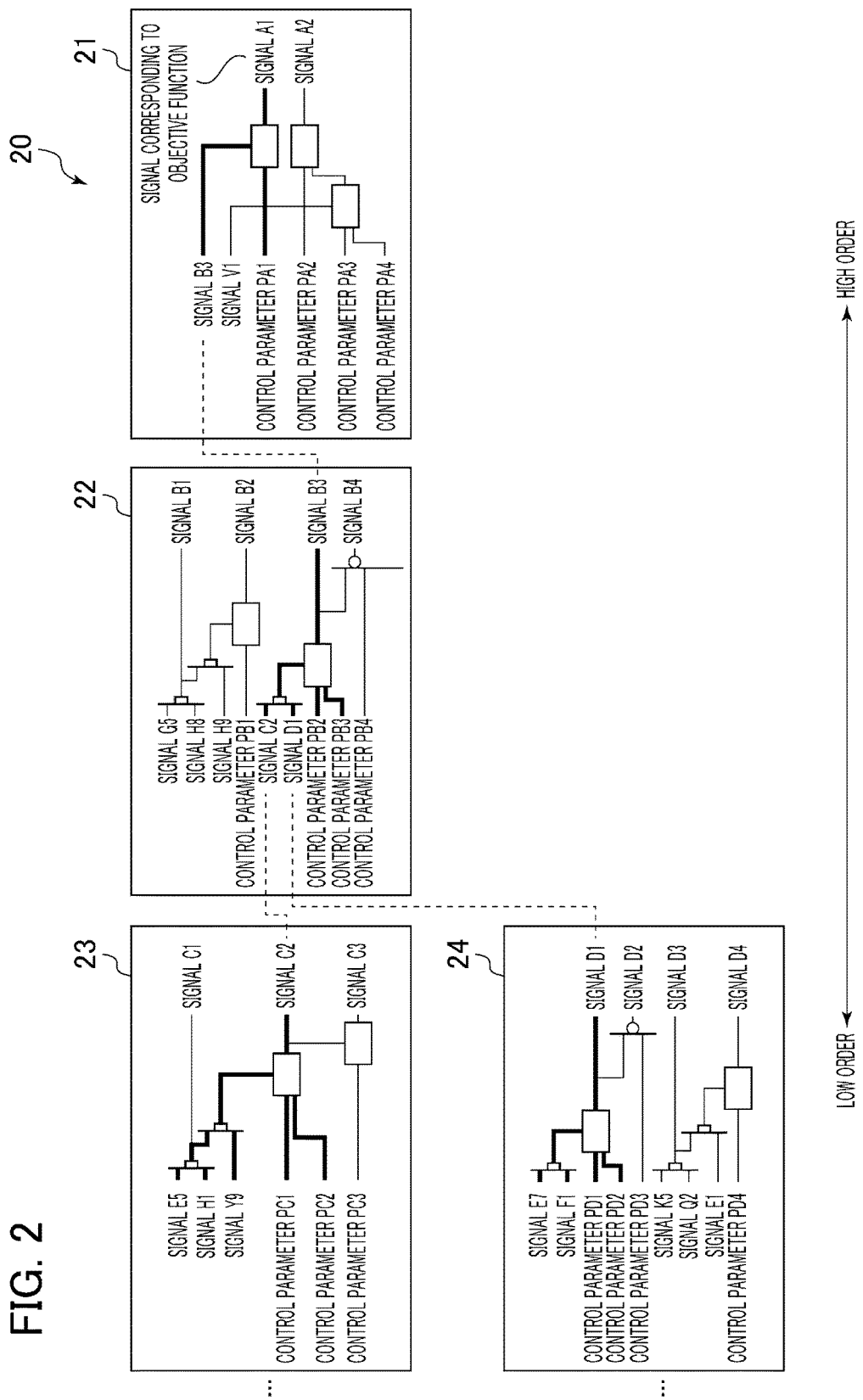
FIG. 2 is a schematic view showing control logic information to be inputted to an optimization control parameter selecting section of the control parameter optimizing system according to the first embodiment.

Described below referring to FIG. 2 are some typical steps for extracting the related control parameters, the steps being performed by the optimization control parameter selecting section 7. FIG. 2 is a schematic view showing typical control logic information to be inputted to the optimization control parameter selecting section 7. In FIG. 2, the control logic information 20 is made up of a plurality of control logic modules 21 to 24 interconnected hierarchically via signal lines. Although there may be control logic modules connected hierarchically above the control logic module 21 or below the control logic module 23 or 24, they are omitted for purpose of simplification and illustration.

Extraction Step 1

First, the optimization control parameter selecting section 7 detects from the control logic modules 21 to 24 a signal corresponding to the objective function (assumed to be the objective function A1 in this example) set by the objective function setting section 1. One way of detecting such a control signal is by searching the control logic modules for the signal having the name of a character string identical or similar to the character string constituting the name of the objective function. In this example, a signal A1 with a character string name that matches the character string "A1" of the objective function A1 is detected from the control logic module 21. Preferably, the detected signal corresponding to the objective function may be displayed on an external monitor, for example, so that the operator can verify the detected signal. If a plurality of signals have been detected, the operator may be prompted to select the appropriate signal on the monitor. In any case, arrangements can be made to let the signal corresponding to the objective function be detected in an interactive manner.

Extraction Step 2

Reference is then made to the control logic module 21 from which the signal A1 corresponding to the objective function is output. A control parameter PA1 connected to the signal A1 is extracted as a related control parameter. Also, a signal B3 connected to the signal A1 is detected.

Extraction Step 3

Then reference is made to the control logic module 22 from which the signal B3 is output. Control parameters PB2 and PB3 connected to the signal B3 are extracted as related control parameters. Also, signals C2 and D1 connected to the signal B3 are detected.

Extraction Step 4

Next, reference is made to the control logic module 23 from which the signal C2 is output. Control parameters PC1 and PC2 connected to the signal C2 are extracted as related control parameters. Reference is further made to the control logic module 24 from which the signal D1 is output. Control parameters PD1 and PD2 connected to the signal D1 are extracted as related control parameters.

Further Steps Omitted

In the manner described above, the control parameters connected to the signal A1 corresponding to the objective function are detected in a hierarchically retroactive manner on the low-order side of the control logic modules 21 to 24, whereby the control parameters related to the objective function A1 (related control parameters) can be extracted. Preferably, information on the correspondence between the objective functions and the previously extracted related control parameters may be stored in a storage device of the control parameter optimizing system 100. When the same objective function is set, the correspondence information may be used to extract the related control parameters. This allows the extraction steps above to be omitted whenever the same objective function is set, shortening the time required to extract the related control parameters.

From the related control parameters extracted in the above-described extraction steps, the optimization control parameter selecting section 7 selects as the optimization control parameter one or a plurality of related control parameters having high sensitivity to the objective function. The sensitivity of a related control parameter to an objective function is defined, for example, by the ratio of the amount of change in the objective function to the amount of change in the related control parameter. The degree of the sensitivity of a related control parameter can be obtained by inputting some different values of the related control parameter to the plant model 3 and making the plant model 3 calculate the objective function for each value. Based on the sensitivity degree obtained from this calculation, the related control parameters for optimization are selected. Preferably, the related control parameters selected as the optimization control parameters may be displayed on an external monitor, for example, so that the operator can verify the selected parameters. Alternatively, a plurality of related control parameters may be displayed in descending order of sensitivity, so that the operator may be prompted to select the optimization control parameter. In any case, arrangements can be made to let the optimization control parameter be detected in an interactive manner.

The optimization control parameter adjusting section 8 adjusts the value of the optimization control parameter selected by the optimization control parameter selecting section 7 in such a manner as to optimize the objective function set by the objective function setting section 1. The optimization control parameter adjusting section 8 then outputs the adjusted optimization control parameter to an optimization control parameter setting section 201. The optimization control parameter adjusting section 8 also outputs the optimized objective function (optimum solution) to an external output interface 14. Described below is a typical procedure for adjusting the value of the optimization control parameter, the steps being performed by the optimization control parameter adjusting section 8.

Adjustment Step 1

The optimization control parameter adjusting section 8 first sets a predetermined value to the optimization control parameter selected by the optimization control parameter selecting section 7. The optimization control parameter adjusting section 8 then inputs the optimization control parameter to the plant model 3. The plant model 3 calculates the objective function based on the value of the optimization control parameter inputted from the optimization control parameter adjusting section 8 using a control model 9 and a physical model 10 (both to be discussed later).

Adjustment Step 2

The optimization control parameter adjusting section 8 adjusts the value of the optimization control parameter in such a manner as to minimize the difference between the calculated value of the objective function outputted from the plant model 3 and a predetermined target value.

The optimization control parameter adjusting section 8 adjusts the optimization control parameter value by performing the above-described adjustment steps once or a number of times. An existing optimization algorithm such as the multi-objective evolutionary algorithm or the successive quadratic programming method may be used in adjusting the value of the optimization control parameter.

It might happen that at the control panel of the control target plant, the control parameters have no constant values and are each defined by the function of a plant process amount, for example. In such a case, the above-described adjustment steps may be performed to obtain an optimization control parameter value for each of a plurality of predetermined process amounts. A function that interpolates these values then may be taken as the optimization control parameter.

From plant control parameter information manually inputted by the operator or automatically inputted from an external system, the control parameter setting section 4 extracts the control parameters necessary for creating the control model 9 (to be discussed later) in the plant model 3. The control parameter setting section 4 sets the extracted control parameters to the control model 9. The control parameter information in this context refers to information on the control parameters stored in the control panel, such as control settings with regard to the controlled amount of the plant, control gain items, their values, and their upper and lower limits. In a variation of this embodiment, plant control logic information instead of the control parameter information may be inputted to the control parameter setting section 4. In this case, the control parameter setting section 4 needs to pattern-recognize the inputted control logic information, such information as signal lines, status symbols and values, and then extract the items with values in the control logic modules, i.e., control parameters and their values constituting the control parameter information.

From plant characteristic information manually inputted by the operator or automatically inputted from an external system, the physical parameter setting section 5 extracts the physical parameters necessary for creating the physical model 10 of the plant model 3. The physical parameter setting section 5 sets the extracted physical parameters to the physical model 10. The plant characteristic information in this context refers to information on the operational condition of the plant: specifically, the heat balance or mass balance of the plant process amount, or the response speed of the plant process amount to changes in heat load. The plant process amount can be represented by the temperature, flow rate, or pressure of the steam generated in response to the heat load on gas turbines or boilers. In a variation of this embodiment, plant operation data (i.e., measurement items and their values) instead of the plant characteristic information may be inputted to the physical parameter setting section 5. In this case, the physical parameter setting section 5 needs to refer to the inputted operation data (e.g., steam temperature, flow rate, and pressure corresponding to the heat load), and then extract the values of the physical parameters necessary for creating the physical model 10.

From plant design information manually inputted by the operator or automatically inputted from an external system, the design parameter setting section 6 extracts the design parameters necessary for creating the physical model 10 of the plant model 3. The design parameter setting section 6 sets the extracted design parameters to the physical model 10. The plant design information in this context refers to design information that is independent of the operational condition of the plant, such as equipment volume and piping length of the plant.

Preferably, if the names of the parameters extracted by the control parameter setting section 4, physical parameter setting section 5, or design parameter setting section 6 do not match those of the parameters registered in the plant model 3, the registered parameters with their names similar to those of the extracted parameters may be displayed along with the latter in a mutually corresponding manner on an external monitor, for example, so that the operator can verify the correspondence.

The plant model 3 has the control model 9 and the physical model 10. The control model 9 simulates the operation of controlling equipment of the control target plant. The physical model simulates the operation of controlled equipment of the control target plant.

The control model 9 is constituted by a table function for converting a plant process amount to a control command value, by a function for generating a pulse signal in response to the magnitude relation between the process amount and a predetermined threshold value, or by a combination of these functions. The control model 9 calculates a control command value based on the calculated value of the plant process amount inputted from the physical model 10. The control model 9 then outputs the calculated control command value to the physical model 10. Also, the control model 9 calculates an objective function based on the plant process amount inputted from the physical model 10. The control model 9 then outputs the calculated objective function to the optimization control parameter selecting section 7 and to the optimization control parameter adjusting section 8.

Preferably, the plant model 3 may have a control model library made of a plurality of control models 9 corresponding to a plurality of different plant control methods, respectively, and may select the appropriate control model 9 corresponding to the control method of the control target plant. This enables the control parameter optimizing system 100 to be applicable to a plant operating on a different control method.

The physical model 10 calculates a plant process amount based on the control command value inputted from the control model 9. The physical model 10 then outputs the calculated process amount to the control model 9. Specifically, from the inputted control command value, the physical model 10 determines a fuel flow rate, a steam flow rate, and valve openings corresponding to these flow rates. Given the mass balance and heat balance of the gas and steam at their respective flow rates, the physical model 10 calculates the temperature, pressure, and flow rate of the gas and those of the steam.

Preferably, the plant model 3 may have a physical model library made of a plurality of physical models 10 corresponding to a plurality of different plant equipment configurations or plant types, respectively, and may select the appropriate physical model 10 corresponding to the equipment configuration or plant type of the control target plant. This enables the control parameter optimizing system 100 to be applicable to a plant of a different equipment configuration or of a different plant type.

Figure 3:
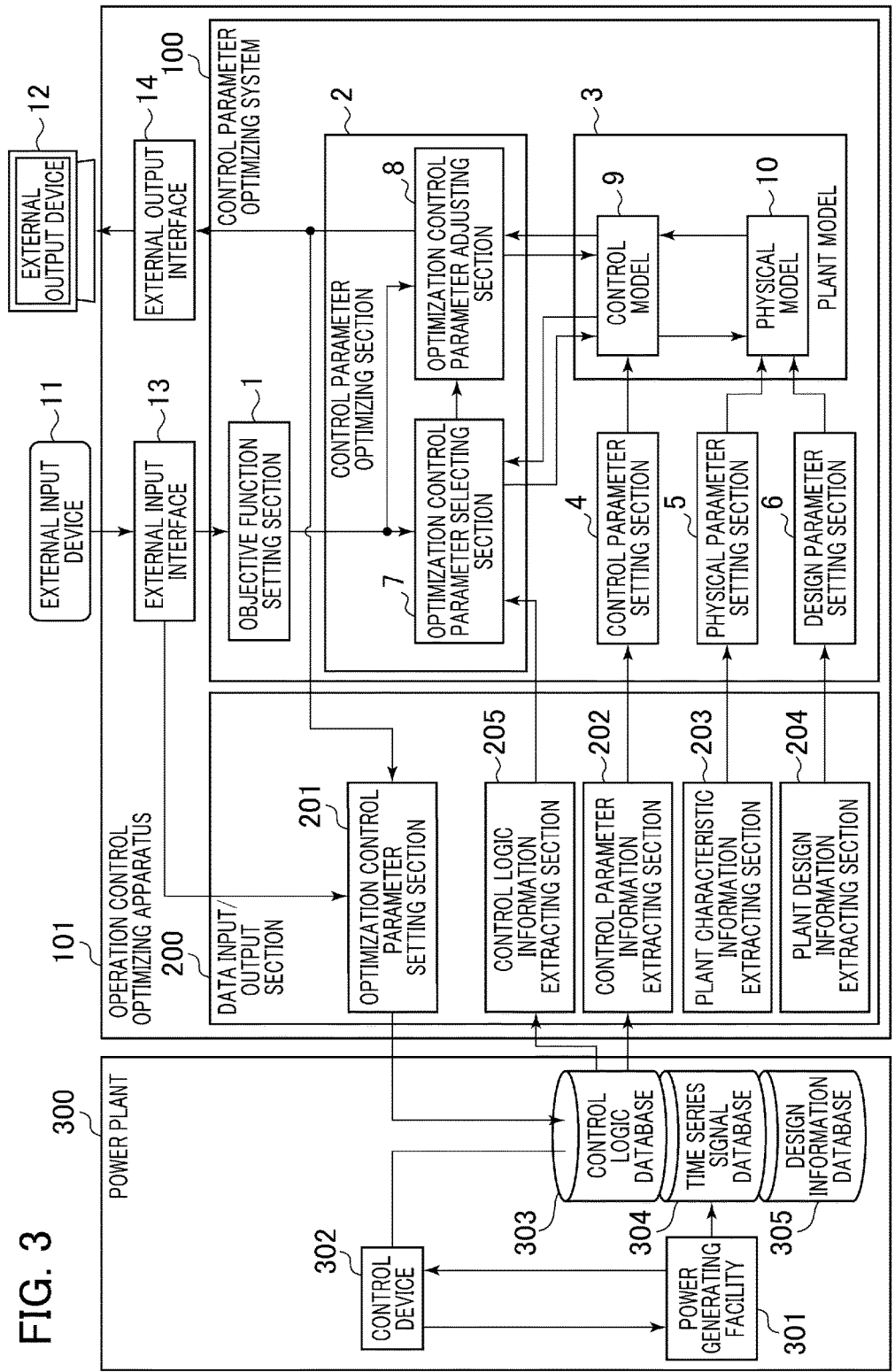
FIG. 3 is a block diagram showing a configuration of an operation control optimizing apparatus equipped with the control parameter optimizing system according to the first embodiment.

FIG. 3 is a block diagram showing a configuration of an operation control optimizing apparatus 101 equipped with the control parameter optimizing system 100 according to this embodiment. As shown in FIG. 3, the operation control optimizing apparatus 101 equipped with the control parameter optimizing system 100 is connected to a power plant 300. This makes it possible to optimize the objective function designated by the operator in the operation control of the power plant 300.

The power plant 300 includes a power generating facility 301 that generates power by combusting fuel, a control device 302 that controls the power generating facility 301, a control logic database 303, a time series signal database 304, and a design information database 305.

The power generating facility 301 is controlled in accordance with the control command values inputted from the control device 302. Measuring devices are installed at various locations in the power generating facility 301. The process amounts measured by these measuring devices are outputted to the control device 302 and to the time series signal database 304.

In accordance with a control program stored in the control logic database 303, the control device 302 calculates control command values based on the process amounts inputted from the power generating facility 301, and then outputs the calculated control command values to the power generating facility 301.

The control logic database 303 stores various control logic modules for use in controlling the power generating facility 301. The control logic database 303 also stores the control program of the control device 302, which is generated based on the control logic modules. The time series signal database 304 stores diverse process amounts inputted from the power generating facility 301. The design information database 305 stores the design information on the power plant 300.

The operation control optimizing apparatus 101 includes the control parameter optimizing system 100, a data input/output section 200, an external input interface 13, and the external output interface 14.

The data input/output section 200 performs data input and output between the power plant 300 and the control parameter optimizing system 100. The data input/output section 200 includes the optimization control parameter setting section 201, a control parameter information extracting section 202, a plant characteristic information extracting section 203, a plant design information extracting section 204, and a control logic information extracting section 205. The control parameter information extracting section 202 extracts control logic information from the control logic database 303 in the power plant 300. The control parameter information extracting section 202 then outputs the extracted control logic information to the control parameter setting section 4. The plant characteristic information extracting section 203 extracts plant characteristic information from the time series signal database 304 in the power plant 300. The plant characteristic information extracting section 203 then outputs the extracted plant characteristic information to the physical parameter setting section 5. The plant design information extracting section 204 extracts plant design information from the design information database 305 in the power plant 300. The plant design information extracting section 204 then outputs the extracted plant design information to the design parameter setting section 6. The control logic information extracting section 205 extracts control logic information from the control logic database 303 in the power plant 300. The control logic information extracting section 205 then outputs the extracted control logic information to the optimization control parameter selecting section 7. The capability of the optimization control parameter setting section 201 will be discussed later.

The control parameter optimizing system 100 calculates the optimized result of the objective function (optimum solution and the corresponding optimization control parameter) based on the information inputted from the control parameter information extracting section 202, plant characteristic information extracting section 203, plant design information extracting section 204, and control logic information extracting section 205. The control parameter optimizing system 100 then outputs the optimized result of the objective function to the optimization control parameter setting section 201 and to the external output interface 14.

The external input interface 13 outputs the objective function inputted from an external input device 11 to the objective function setting section 1 of the control parameter optimizing system 100. In this manner, the operator can designate the objective function desired to be optimized by operating the external input device 11.

The external output interface 14 outputs to an external output device 12 the optimized result of the objective function outputted from the control parameter optimizing section 2 of the control parameter optimizing system 100. The external output device 12 is configured by a device that has a screen display capability, such as a personal computer (PC) monitor. In this manner, the operator can verify the optimized result of the objective function via the external output device 12.

Figure 4A:
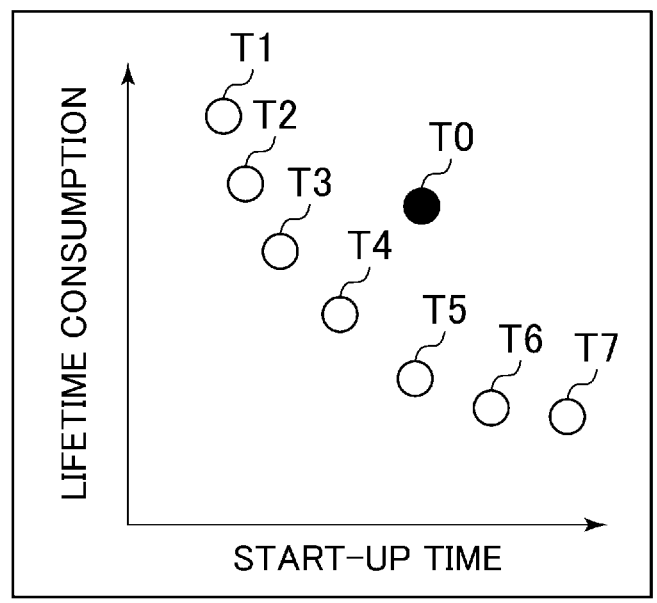
FIGS. 4A and 4B are schematic views showing typical display of optimum solutions for two cases, one case being one in which start-up time and lifetime are set as the objective functions, the other case being one in which start-up time, lifetime consumption, and fuel cost are set as the objective functions.

Described below are the optimum solutions of objective functions in the case where the control parameter optimizing system 100 is applied to the control operation for the plant's start-up. FIG. 4A shows typical display of optimum solutions for the case in which start-up time and lifetime consumption are set as the objective functions. At the power plant, start-up time and lifetime consumption are generally in a trade-off relation with each other. If a known multi-objective evolutionary algorithm is adopted, for example, as the optimization method for the optimization control parameter adjusting section 8, a plurality of optimum solutions T1 to T7 for improving start-up time and lifetime in total are calculated with regard to an objective function T0 yet to be optimized. When the optimum solutions T1 to T7 as well as the objective function T0 yet to be optimized are displayed together as shown in FIG. 4A, the operator can verify the improvement of the optimized objective function.

Figure 4B:
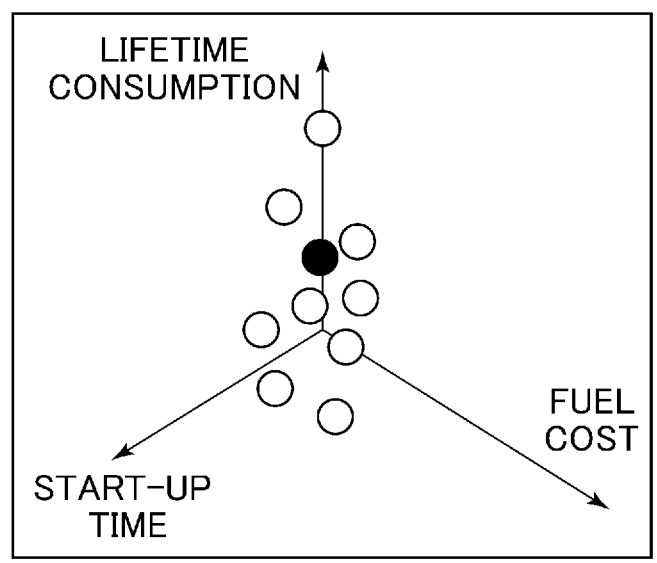

FIG. 4B shows typical display of optimum solutions for the case in which start-up time, lifetime consumption, and fuel cost are set as the objective functions. If four or more objective functions are set, they may be divided into groups of up to 3 objective functions when displayed. For example, if four objective functions are set, they may be divided into a group of three objective functions and one objective function, or into two groups of two objective functions each when displayed.

Figure 5:
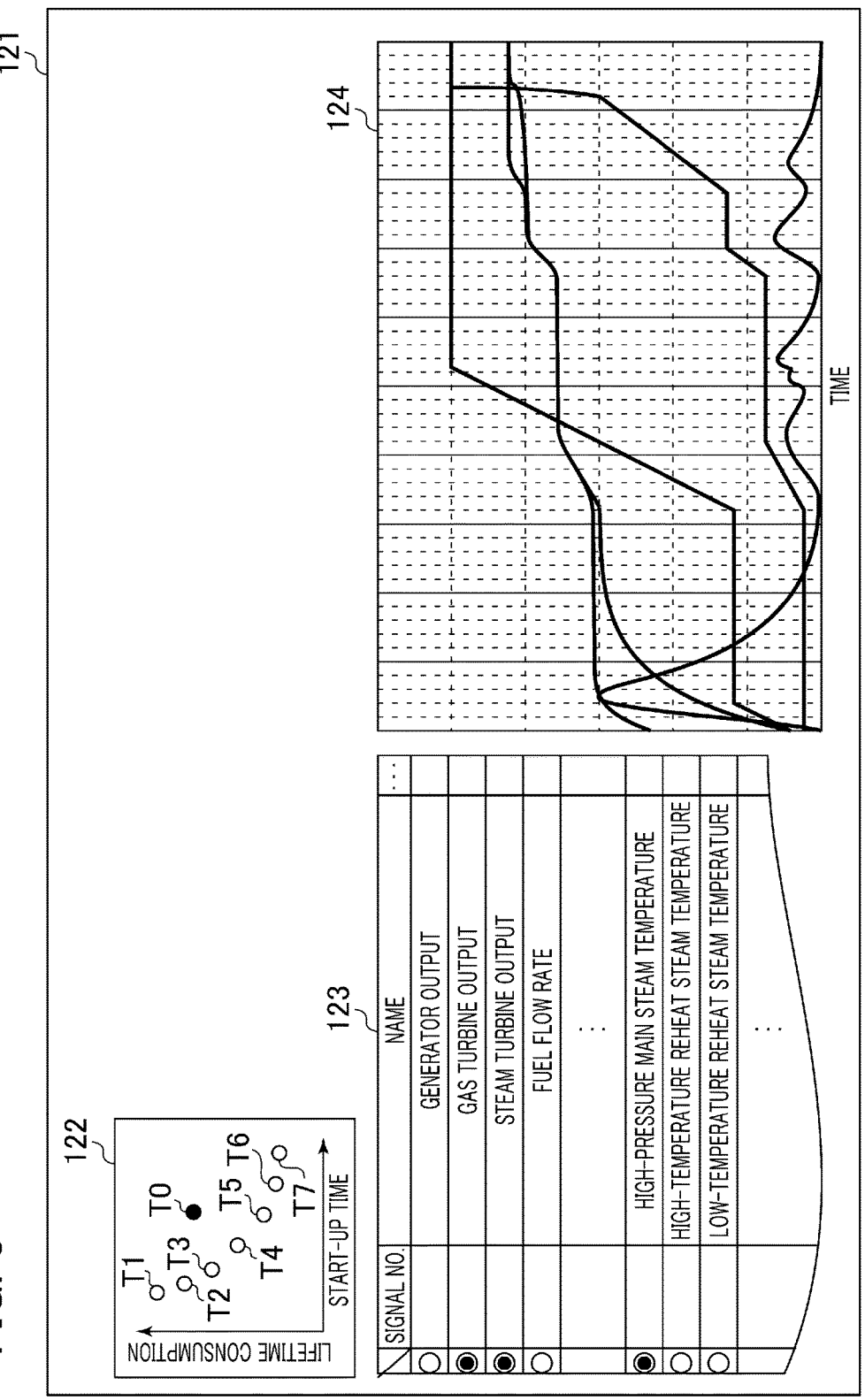
FIG. 5 is a schematic view showing another typical display of the optimum solutions for the case in which start-up time and lifetime consumption are set as the objective functions.

Preferably, when a plurality of optimum solutions T1 to T7 are calculated as a result of optimizing the objective functions as shown in FIG. 4A, a display screen of the external output device 12 may be configured to display the operation characteristics of each of the optimum solutions for verification. This configuration is described below referring to FIG. 5. FIG. 5 shows another typical display of the optimum solutions for the case in which start-up time and lifetime consumption are set as the objective functions. In FIG. 5, a display screen 121 of the external output device 12 displays an optimum solution displaying region 122 that displays the optimum solutions of an objective function, a list displaying region 123 that displays a list of process amounts of the plant, and a time series data displaying region 124 that displays time series data of the process amounts. By operating the external input device 11, the operator selects one of a plurality of optimum solutions T1 to T7 displayed in the optimum solution displaying region 122 and check-marks one or more process amounts displayed in the list displaying region 123. This causes the time series data displaying region 124 to display the time series data of the process amounts check-marked in the list displaying region 123, the process amounts being part of those corresponding to the optimum solution selected in the optimum solution displaying region 122. This allows the operator to verify the operation characteristics of each of the multiple optimum solutions T1 to T7.

Returning to FIG. 3, the optimization control parameter setting section 201 of the data input/output section 200 sets to the control logic database 303 of the power plant 300 the optimization control parameter corresponding to the optimum solution selected by the operator having operated the external input device 11, the optimization control parameter being part of the optimized result (a plurality of optimum solutions and their corresponding optimization control parameters) outputted from the control parameter optimizing system 100. If none of the multiple optimum solutions is selected by the operator, no optimization control parameter will be set to the control logic database 303. This enables the actual control of the power plant 300 to reflect an appropriate optimum solution that can achieve the desired operation characteristics, the appropriate optimum solution being one of the multiple optimum solutions calculated by the control parameter optimizing system 100.

The above-described control parameter optimizing system 100 according to this embodiment optimizes objective functions by adjusting the values of the control parameters stored in the control logic database 303 of the power plant 300. Thus when applying the control parameter optimizing system 100 to an existing power plant 300, there occurs no need to modify the control panel or the equipment of the plant 300. And because the objective function setting section 1 can be used to set the objective function desired to be optimized, the operation control of the power plant 300 can be optimized in accordance with diverse operational requirements from the operator.

Further, the optimization control parameter selecting section 7 extracts the control parameters related to the objective function (i.e., related control parameters) from the control logic information 20 of the power plant 300. The optimization control parameter selecting section 7 then selects from the related control parameters the control parameter having high sensitivity to the objective function (i.e., optimization control parameter). This makes it possible to optimize the objective function more efficiently than if the control parameters were selected by the operator based on his or her personal experience. Because the control parameters of which values need to be adjusted using the plant model 3 are limited to the optimization control parameter, the amount of the calculations using the plant model 3 is minimized.

Also, the control parameter setting section 4 sets to the control model 9 the control parameters extracted from the power plant 300. The physical parameter setting section 5 and the design parameter setting section 6 set to the physical model 10 the physical parameters and the design parameters, respectively, extracted from the power plant 300. The settings create the plant model 3 that faithfully simulates the operation of the power plant 300. This enables the optimization control parameter selecting section 7 to improve the accuracy of the selection and the optimization control parameter adjusting section 8 to enhance the accuracy of the adjustment.

Furthermore, the operation control optimizing apparatus 101 according to this embodiment has the data input/output section 200 performing data input and output between the power plant 300 and the control parameter optimizing system 100. This eliminates the need for the operator's input or output operations, thereby reducing the amount of work done by the operator.

Also, by means of the external output device 12 and external input device 11, the operator can verify the dynamic characteristics of each of a plurality of optimum solutions calculated by the control parameter optimizing system 100. This enables the actual control of the power plant 300 to reflect an appropriate optimum solution that can achieve the desired operation characteristics.

Second Embodiment

Figure 6:
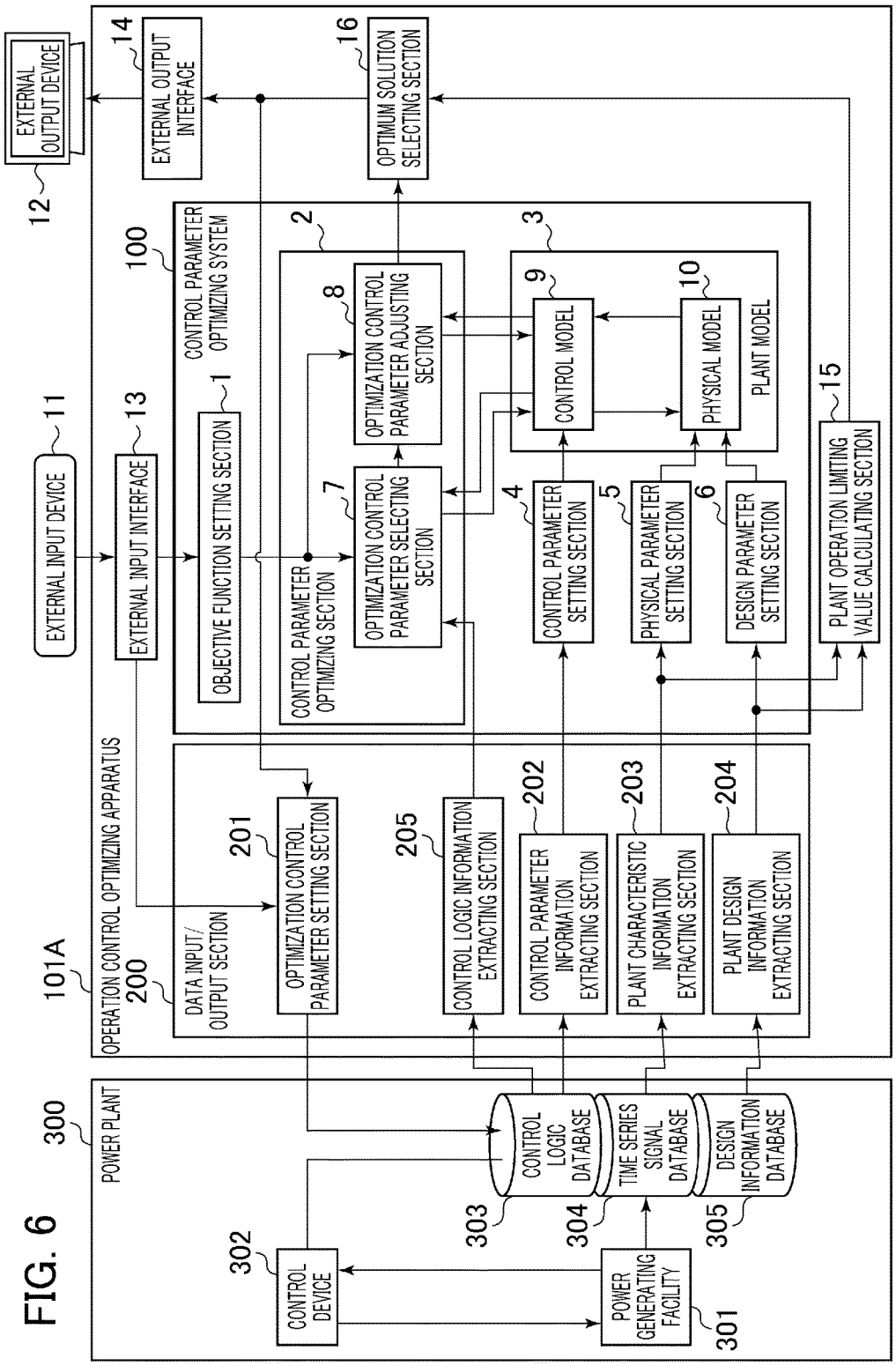
FIG. 6 is a block diagram showing a configuration of an operation control optimizing apparatus according to a second embodiment of the present invention.

FIG. 6 is a block diagram showing a configuration of an operation control optimizing apparatus according to a second embodiment of the present invention. In FIG. 6, the operation control optimizing apparatus 101A differs from the operation control optimizing apparatus 101 according to the first embodiment (FIG. 3) in that the apparatus 101A further includes a plant operation limiting value calculating section 15 and an optimum solution selecting section 16.

The plant operation limiting value calculating section 15 calculates plant operation limiting values based on the plant characteristic information extracted by the plant characteristic information extracting section 203 and on the plant design information extracted by the plant design information extracting section 204. The plant operation limiting value calculating section 15 then outputs the calculated plant operation limiting values to the optimum solution selecting section 16. The plant operation limiting values in this context refer to the limiting values (upper or lower limits) on the plant process amounts (e.g., lifetime consumption of component devices, temperature, pressure, and rate of load change).

Described below is a typical procedure performed by the plant operation limiting value calculating section 15 to calculate a plant operation limiting value when the plant operation limiting value is defined as the lifetime consumption per start-up of a steam turbine rotor (simply called the lifetime consumption hereunder). Using a known fatigue life assessment method, the plant operation limiting value calculating section 15 first calculates lifetime consumption of the steam turbine rotor based on the heat stress generated in the steam turbine rotor included in the plant characteristic information and on the rotor material included in the plant design information. The plant operation limiting value calculating section 15 then calculates the remaining lifetime by subtracting the sum of the lifetime consumption in the past operation cycles from the total lifetime of the steam turbine rotor. The plant operation limiting value calculating section 15 then calculates the lifetime consumption by dividing the remaining lifetime by the remaining number of times the turbine is scheduled to be started up.

Out of a plurality of optimum solutions inputted from the control parameter optimizing section 2, the optimum solution selecting section 16 selects the optimum solution that will meet the plant operation limiting values inputted from the plant operation limiting value calculating section 15. The optimum solution selecting section 16 then outputs the optimization control parameter corresponding to the optimum solution to the optimization control parameter setting section 201.

Figure 7:
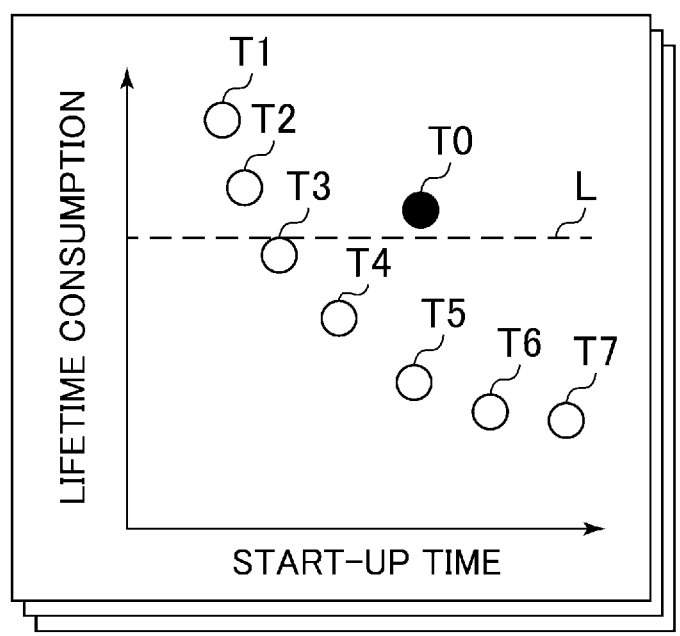
FIG. 7 is a schematic view showing an example a typical relation between multiple optimum solutions and a plant operation limiting value for the case in which start-up time and lifetime consumption are set as the objective functions and an upper limit of the lifetime consumption is set as the plant operation limiting value.

The capability of the optimum solution selecting section 16 is described below in detail referring to FIG. 7. FIG. 7 is a schematic view showing a typical relation between multiple optimum solutions and a plant operation limiting value for the case in which start-up time and lifetime consumption are set as the objective functions and an upper limit of the lifetime consumption is set as the plant operation limiting value. The optimum solution selecting section 16 selects one of the optimum solutions T3 to T7 meeting the plant operation limiting value L from among the multiple optimum solutions T1 to T7. FIG. 7 shows an example in which the optimum solution T3 closest to the plant operation limiting value L is selected from the optimum solutions T3 to T7 meeting the limiting value L. There may also be other diverse methods for selecting the optimum solution. For example, from among the optimum solutions T3 to T7 that meet the plant operation limiting value L, the optimum solution having a minimum weighted average of start-up time and lifetime consumption may be selected.

The operation control optimizing apparatus 101A according to the second embodiment provides the same effects as the apparatus of the first embodiment. In addition, from a plurality of optimum solutions calculated by the control parameter optimizing section 2, the optimum solution selecting section 16 selects the optimum solution meeting the plant operation limiting value calculated by the plant operation limiting value calculating section 15. This eliminates the need for the operator's selecting operation, thereby reducing the amount of work done by the operator.

Variations

The present invention is not limited to the above-described embodiments and may be implemented in diverse variations. For example, although the operation control optimizing apparatus 101 according to the first embodiment (refer to FIG. 3) and the operation control optimizing apparatus 101A according to the second embodiment (refer to FIG. 6) each have the data input/output section 200 that performs automatic input of necessary data from the power plant 300 to the control parameter optimizing system 100, this is not limitative of the present invention. Alternatively, the operator may manually input the necessary data to the control parameter optimizing system 100.

Preferably, the information to be inputted to the optimization control parameter selecting section 7, to the control model 9, and to the physical model 10 may be stored beforehand in a storage device of the control parameter optimizing system 100. When the control parameter optimizing system 100 is applied to another plant of the same type and of a similar scale and when part of the information to be inputted to the optimization control parameter selecting section 7, to the control model 9, or to the physical model 10 is found defective or missing, the defective or missing data may be supplemented with the past inputted information stored in the storage device.

Although the above embodiments were described using examples in which the control parameter optimizing system 100 is applied to the control operation for the plant's start-up, i.e., in which the control parameters are optimized while the plant is being stopped (before start-up), this is not limitative of the present invention. Alternatively, the control parameters may be optimized successively while the plant is in operation, for example.

DESCRIPTION OF REFERENCE CHARACTERS

1: Objective function setting section
2: Control parameter optimizing section
3: Plant model
4: Control parameter setting section
5: Physical parameter setting section
6: Design parameter setting section
7: Optimization control parameter selecting section
8: Optimization control parameter adjusting section
9: Control model
10: Physical model
11: External input device
12: External output device
13: External input interface
14: External output interface
15: Plant operation limiting value calculating section
16: Optimum solution selecting section
20: Control logic information
21-24: Control logic module
100: Control parameter optimizing system
101, 101A: Operation control optimizing apparatus
121: Display screen
122: Optimum solution displaying region
123: List displaying region
124: Time series data displaying region
200: Data input/output section
201: Optimization control parameter setting section
202: Control parameter information extracting section
203: Plant characteristic information extracting section
204: Plant design information extracting section
205: Control logic information extracting section
300: Power plant
301: Power generating facility
302: Control device
303: Control logic database
304: Time series signal database
305: Design information database

What is claimed is:

1. A control parameter optimizing system comprising:
an objective function setting section that sets an objective function to be optimized in controlling operation of an existing power plant;
a plant model that simulates the operation of the existing power plant and calculates a process amount of the existing power plant and a value of the objective function; and
a control parameter optimizing section that optimizes values of control parameters of the existing power plant using the plant model in such a manner as to optimize the objective function;
wherein the control parameter optimizing section includes:
an optimization control parameter selecting section that, based on control logic information extracted from a control logic database of the existing power plant, selects a control parameter from the control parameters as an optimization control parameter that is for use in optimizing the objective function; and
an optimization control parameter adjusting section that adjusts a value of the optimization control parameter using the plant model in such a manner as to optimize the objective function.

2. The control parameter optimizing system according to claim 1, wherein the optimization control parameter selecting section extracts, from the control logic information, control parameters related to the objective function as related control parameters, and then selects the optimization control parameter from the related control parameters.

3. The control parameter optimizing system according to claim 2, wherein the optimization control parameter selecting section calculates the sensitivity of each of the related control parameters to the objective function using the plant model, and then selects from the related control parameters the optimization control parameter based on a degree of the calculated sensitivity.

4. The control parameter optimizing system according to claim 2, wherein the optimization control parameter selecting section stores information on the correspondence between the objective function and the related control parameters after selecting the related control parameters, and the optimization control parameter selecting section extracts the related control parameters from the correspondence information when the objective function setting section sets the same objective function.

5. The control parameter optimizing system according to claim 1, wherein the optimization control parameter adjusting section performs once or a number of times consecutively a process in which a predetermined value is set to the optimization control parameter, and then the optimization control parameter is inputted to the plant model, and then the predetermined value is changed so as to minimize the difference between a predetermined target value and the calculated value of the objective function outputted from the plant model.

6. The control parameter optimizing system according to claim 1, wherein the plant model includes:
a control model that simulates the operation of controlling equipment of the existing power plant; and
a physical model that simulates the operation of controlled equipment of the existing power plant;
the control model calculates the objective function and a control command value for the physical model based on the plant process amount calculated by the physical model; and
the physical model calculates the plant process amount based on the control command value calculated by the control model.

7. The control parameter optimizing system according to claim 6, wherein the plant model includes:
a control model library made of a plurality of the control models corresponding to a plurality of different plant control methods, respectively; and
a physical model library made of a plurality of the physical models corresponding to a plurality of different plant configurations or plant types, respectively.

8. An operation control optimizing apparatus comprising:
the control parameter optimizing system according to claim 1;
an external output device that displays a plurality of optimum solutions calculated for the objective function by the control parameter optimizing section; and
an external input device that, operated by an operator, selects an optimum solution from among the optimum solutions displayed on the external output device, the optimum solution being to be reflected in controlling the operation of the existing power plant.

9. An operation control optimizing apparatus comprising:
the control parameter optimizing system according to claim 1;
a plant operation limiting value calculating section that calculates an operation limiting value of the existing power plant based on the plant characteristic information and the plant design information; and
an optimum solution selecting section that, from a plurality of optimum solutions calculated by the control parameter optimizing section, selects an optimum solution meeting the operation limiting value as an optimum solution to be reflected in controlling the operation of the existing power plant.

10. An operation control optimizing apparatus comprising:
the control parameter optimizing system according to claim 1; and
a data input/output section that performs data input and output between the existing power plant and the control parameter optimizing system;
wherein the data input/output section includes:
a control logic extracting section that extracts control logic information from a control logic database of the existing power plant, and then outputs the extracted control logic information to the optimization control parameter selecting section;
a plant characteristics information extracting section that extracts physical parameter information from a time series signal database of the existing power plant, and then outputs the extracted physical parameter information as a parameter of the plant model to a physical parameter setting section;
a design parameter extracting section that extracts design information on the existing power plant from a design information database of the existing power plant, and then outputs the extracted plant design information as a parameter of the plant model to a design parameter setting section; and
an optimization control parameter setting section that sets to the control logic database the optimization control parameter outputted from the optimization control parameter adjusting section.

* * * * *